United States Patent [19]

Belart et al.

[11] 4,416,491

[45] Nov. 22, 1983

[54] PRESSURE CONTROLLING ARRANGEMENT FOR USE IN A VEHICLE BRAKE SYSTEM

[75] Inventors: Juan Belart, Walldorf; Jochen Burgdorf, Offenbach; Dieter Kircher, Frankfurt am Main; Hans-Wilhelm Bleckmann, Obermoerlen; Lutz Weise, Mainz, all of Fed. Rep. of Germany

[73] Assignee: ITT Industries, Inc., New York, N.Y.

[21] Appl. No.: 316,153

[22] Filed: Oct. 28, 1981

[30] Foreign Application Priority Data

Oct. 28, 1980 [DE] Fed. Rep. of Germany ....... 3040562

[51] Int. Cl.$^3$ .............................................. B60T 8/02
[52] U.S. Cl. .................................... 303/113; 303/52
[58] Field of Search ................... 60/548; 188/345; 303/66, 10, 52, 85, 92, 113–116, 119

[56] References Cited

U.S. PATENT DOCUMENTS 4,340,257 7/1982 Belart ................................. 303/114
4,354,714 10/1982 Belart ................................. 303/114

*Primary Examiner*—Duane A. Reger
*Attorney, Agent, or Firm*—James B. Raden; Marvin M. Chaban

[57] ABSTRACT

A control arrangement of a hydraulic vehicle braking system provided with antiskid control equipment includes a master cylinder device which is actuatable by a brake pedal and is provided with at least one master piston cooperating with an associated replenishment chamber. The replenishment chamber is hydraulically connected through a substantially radial bore with the secondary side of the master piston. An axially displaceable circumferentially sealed positioning piston is disposed at the secondary side of the master piston, and a piston rod of the master piston concentrically and sealingly passes through the positioning piston. The piston rod of the master piston is provided, at its free end which is closer to the brake pedal, with an enlarged circumferential projection which can be brought in engagement with an associated circumferential edge of the positioning piston upon depression of the brake pedal and after admission of the pressurized hydraulic fluid from the auxiliary energy source to the secondary side of the master piston in such a manner that the master piston is moved into a defined position during antiskid control operation. Alternatively, this engagement of the positioning piston can take place with a circumferential projection of a throttling valve which is interposed between the brake pedal and the master cylinder device.

10 Claims, 4 Drawing Figures

PRESSURE CONTROLLING ARRANGEMENT FOR USE IN A VEHICLE BRAKE SYSTEM

BACKGROUND OF THE INVENTION

The present invention relates to an arrangement for controlling the effective pressure of a hydraulic braking fluid in a vehicle braking system in general, and more particularly to a controlling arrangement for use in a vehicle braking system provided with an auxiliary pressurized hydraulic fluid source and antiskid control equipment.

There are already known various constructions of control arrangements for use in vehicle braking systems, among them such which find particular use in vehicle braking systems provided with an auxiliary source of pressurized hydraulic fluid and antiskid control equipment. It is also known to provide the hydraulic braking system provided with a controlling arrangement of this type which is supplied with pressurized hydraulic fluid from the auxiliary pressure or energy source with a brake-pedal actuatable master cylinder device including at least one master piston and an associated replenishment chamber which is connected through a replenishment port with a space adjacent to an end surface of the master piston which faces toward the brake pedal, while the oppositely facing or working end surface of the master piston delimits a working compartment in the master cylinder device, and to supply the pressurized hydraulic fluid into the working compartment of the master cylinder device. One construction of a control arrangement of a hydraulic vehicle braking system of this type is known from the German, published patent application DE-OS No. 24 43 545, wherein the master cylinder device is constructed as a tandem master cylinder in which the master piston which is closer to the brake pedal is equipped with a piston rod which is integrally provided at its free end that is closer to the brake pedal with a circumferential flange, the outer diameter of the circumferential flange being greater than the outer diameter of the associated master piston. A travel limiting spring is interposed between a brake-pedal actuated brake valve arrangement which is disposed between the brake pedal and the tandem master cylinder and which controls the supply of the pressurized hydraulic fluid from the auxiliary energy source, on the other hand, and the circumferential flange, on the other hand. One of the main purposes of this travel limiting spring is to give the driver a good brake pedal "feel" during brake pedal actuation. During normal braking, that is, without antiskid control action, the pressurized hydraulic fluid from the auxiliary energy source is supplied through the brake valve of the brake valve arrangement to the replenishing chambers of the tandem master cylinder and from there to the secondary side of the master piston. The circumferential flange which has a greater diameter than the master piston and which is sealed at its area of circumferential juxtaposition with the housing of the master cylinder device assures that, during the normal operation, both master pistons are being held in their initial or starting position, while the circumferential flange abuts against an axial abutment which is rigid with the housing of the master cylinder device and which is disposed close to the brake pedal. The pressurized hydraulic fluid which is supplied to the secondary side of the master piston flows through axial filling bores in the master piston into the working compartments of the master cylinder device and from there to the associated wheel brake actuating cylinders under dynamically controlled conditions. In the event that the auxiliary energy source fails, the circumferential flange of the master piston which is closer to the brake pedal is no longer held in abutment with the axial abutment that is rigid with the housing so that the two master pistons can move in unison in the working direction, so that the master cylinder device then performs its usual function, that is, the master pistons pressurize the fluid present in the working compartments and thus control the operation of the wheel brake actuating cylinders in a static manner. As advantageous as this conventional arrangement may be in many respects, it also has an important disadvantage which resides in the rather complicated structure of the master piston which is closer to the brake pedal due to the provision of the enlarged circumferential flange at the end of the piston rod which is closer to the brake pedal and which has a diameter exceeding that of the master piston. Inasmuch as the master piston is arrested in its initial position during normal operation, there must be provided means in the form of a travel limiting spring for giving the driver a good brake pedal "feel" during the operation. The brake valve arrangement by itself is not suited for this purpose. Inasmuch as the master piston is stationary during normal operation (and thus does not perform any function), it cannot be recognized during the normal operation of the brake whether or not the master piston has defective regions (such as possible leakage location at the region of the lip sealing of the master piston).

SUMMARY OF THE INVENTION

Accordingly, it is a general object of the present invention to avoid the disadvantages of the prior art.

More particularly, it is an object of the invention to provide a control arrangement for use in a hydraulic vehicle braking system which is not possessed of the disadvantages of the conventional arrangement of this type.

Still another object of the invention is to so construct the controlling arrangement as to keep the energy consumption thereof to a minimum.

A concomitant object of the present invention is to so design the control arrangement of the type here under consideration as to be simple and compact in construction, inexpensive to manufacture and reliable in operation nevertheless.

In pursuance of these objects and others which will become apparent hereafter, one feature of the present invention resides in an arrangement for controlling the effective pressure of a hydraulic braking fluid in a vehicle braking system provided with an auxiliary source of pressurized hydraulic fluid and antiskid control equipment, in dependence on the position of a brake pedal, wherein the controlling arrangement comprises a master cylinder device including a housing defining a bore having a first section of a smaller diameter and an aligned adjacent second section of a larger diameter, and at least one master piston received in the first section of the bore for movement in opposite directions and operatively connected to the brake pedal for movement therewith at least in one of such directions, the master piston delimiting a working compartment in the first section of the bore frontwardly thereof as considered in the opposite direction and having an extension received with a spacing in the second section of the bore; at least one positioning piston surrounding the extension for sealed sliding relative thereto and to the housing in the second section of the bore; entraining means on the extension and on the positioning piston for engaging one another in an engaging position of the positioning piston relative to the extension; and means for admitting the pressurized fluid from the auxiliary source into the working compartment and into the second section of the bore frontwardly of the positioning piston during antiskid control action of the antiskid control equipment to replenish the supply of pressurized fluid in the working compartment and to urge the positioning piston into a predetermined position relative to the housing in which the entraining means is engaged and the master piston assumes a defined position within the bore.

In this manner, the master piston can be given a simple construction. In a tandem master cylinder construction, substantially identical master pistons of conventional construction can be used. During normal braking operation, stepping-through of the brake pedal is possible, so that the master cylinder device performs its normal function with static control of the operation of the wheel brake operating cylinders. In this manner, the operatability of the master cylinder device can be monitored during normal braking operation. At the same time, the driver gets a good brake feeling so that a travel limiting or simulating arrangement can be omitted when desired. As a result of the provision of the positioned piston, it is assured that a volume of hydraulic fluid which is sufficient for the normal braking operation will remain in the working compartment of the master cylinder device even when the brake pedal is depressed, which is advantageous for emergency situations (failure of the auxiliary energy source, failure of one braking circuit, antiskid control operation). The opposing force of the positioning piston is so large that the brake pedal is being held in a defined position. Thus, the brake pedal is not fully returned, so that the driver will not be irritated in a critical situation.

Advantageously, the housing has an axial abutment for the positioning piston in the second section of the bore, and spring means is provided for urging the positioning piston in the frontward direction toward engagement with the abutment. Under these circumstances, the spring means is generally situated at that side of the positioning piston which is close to the brake pedal. More particularly, the positioning piston has an external annular flange and the housing has an annular zone situated rearwardly from the annular flange, the spring means including a compression spring surrounding the positioning piston and acting on the annular flange and the annular zone. This compression spring serves for the adjustment of a defined rest position of the positioning piston and is so dimensioned as to be able to overcome the frictional forces encountered at the respective seals.

According to a further advantageous aspect of the present invention, stop means is provided on the housing, such stop means extending into the path of movement of the entraining means of the positioning piston to be engaged by the latter in the predetermined position of the positioning piston and thus to define the defined position of the master piston. The stop means is so situated that the defined position of the master piston which is achieved when the entraining means are in engagement with one another corresponds to an intermediate position of the master piston.

When the master cylinder device is constructed as a tandem master cylinder, it further includes an additional master piston received in the first section of the bore in tandem with and frontwardly of the one master piston to delimit and additional working compartment frontwardly thereof, only the aforementioned one master piston being equipped with a positioning piston.

In an alternative advantageous construction of the controlling arrangement, the housing has an axial abutment for the positioning piston in the second section of the bore, and there is provided spring means for urging the positioning piston in the rearward direction toward engagement with the abutment. Under these circumstances, the spring means is substantially situated at the side of the positioning piston which is remote from the brake pedal.

In this context, it is further advantageous when the positioning piston has an external annular flange and the housing has an annular zone situated frontwardly from the annular flange, and when the spring means includes a compression spring surrounding the positioning piston and acting on the annular flange and the annular zone.

In a particular advantageous construction of the controlling arrangement of the present invention which is suited for use in a hydraulic braking system including at least one return conduit, a return valve is interposed in the return conduit and is mounted on the housing at the second section of the bore, this return valve having an actuating portion movable into and out of the path of movement of the positioning piston between its open and closed positions, the positing piston having a frontwardly and outwardly inclined surface at its rearward end portion for engaging the actuating portion of the return valve and displacing the same toward the open position as the positioning piston approaches its predetermined position.

A particularly advantageous construction of the controlling arrangement is obtained when the entraining means includes an external annular projection at the free end portion of the extension and an annular contact zone on the positioning piston. It is further advantageous when a throttling valve is at least partially accommodated in or constituted by the extension of the master piston.

BRIEF DESCRIPTION OF THE DRAWING

Above-mentioned and other features and objects of this invention will become more apparent by reference to the following description taken in conjunction with the accompanying drawings, in which.

DETAILED DESCRIPTION OF THE PREFERRED EMBODIMENT

Figure 1:
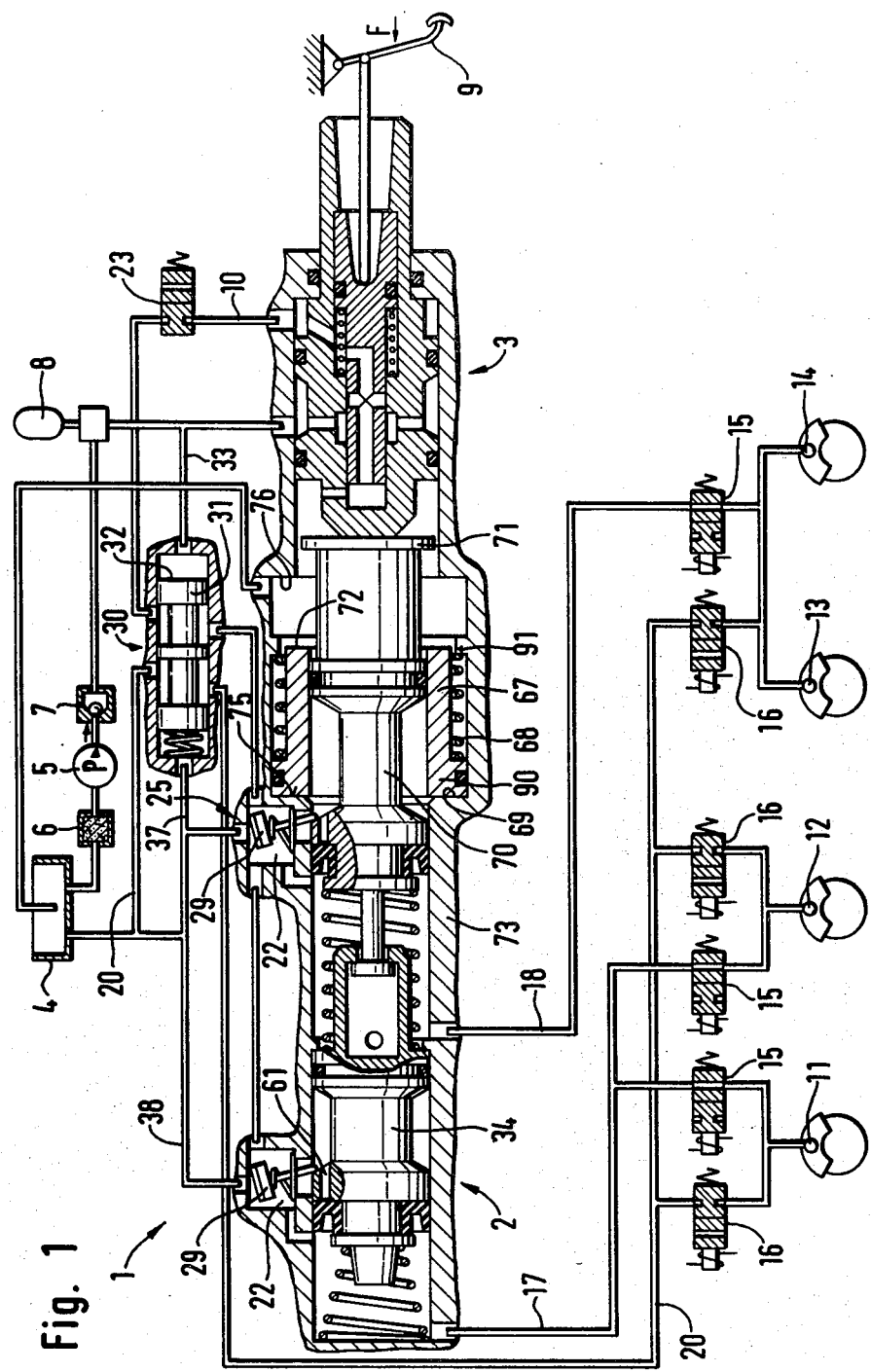
FIG. 1 is a partially diagrammatic partially sectioned view of a controlling arrangement of the present invention as incorporated in a vehicle braking system in which a positioning piston is spring-biased in the direction of the brake pedal force.

Referring now to the drawing in detail, and first to FIG. 1 thereof, it may be seen that the reference numeral 1 has been used to identify a control arrangement according the present invention as incorporated in a hydraulic braking system of a vehicle which is provided with an antiskid control equipment. The control arrangement 1 includes a master cylinder device 2 and a braking valve device 3 which is arranged before the master cylinder device 2, that is, between a brake pedal 9 and the master cylinder device 2. The master cylinder device 2 is constructed as a tandem master cylinder, while the brake valve device 3 is constituted by a hydraulic brake power booster having a control valve member which is connected, in a known manner, with the brake pedal 9. The master cylinder device 2 has two master pistons 34 which have replenishing chambers 22 associated therewith. Radial replenishment ports connect the replenishment chambers 22 with the spaces adjacent to the secondary side of the respectively associated master pistons 34, that is, those master piston sides which face toward the brake pedal 9. Furthermore, the master pistons 34 are provided with respective axial feeding bores 61 which permit flow of hydraulic fluid from the secondary side to the primary or working side of the respective master piston 34, whereas hydraulic fluid flow in the opposite direction is prevented. The two replenishment chambers 22 of the tandem master cylinder 2 are connected via a hydraulic conduit 10 with an auxiliary energy output of the brake force booster 3, valve means which will be discussed in more detail below being interposed therebetween.

The master pistons 34 delimit respective working compartments in the master cylinder device 2, each of the working compartments having an outlet. A supply or braking conduit 17 of a first (static) brake circuit communicates with a first of these outlets of the tandem master cylinder device 2 at its upstream end, and with wheel brake actuating cylinders 11 and 12 associated with the front axle of a vehicle at its downstream end. Electromagnetically actuatable, normally open, two-port two-position valves 15 are incorporated in the first braking conduit 17, these valves 15 being under the control of an antiskid control unit which is of a conventional construction and hence has not been illustrated and which causes the valves 15 to close during antiskid control operation. The wheel brake actuating cylinders 11 and 12 are further connected through a return conduit 20 with a low-pressure hydraulic supply reservoir 4. Further electromagnetically actuatable two-port two-position valves 16 which are associated with the wheel brake actuating cylinders 11 and 12 are interposed in the return conduit 20. The valves 16 are closed under normal braking conditions and open when electric current is supplied thereto. The valves 16 are also connected to the aforementioned antiskid control unit which determines the existence of impermissibly high values of slip between the vehicle tires and the roadway and operates the valves 15 and 16 in a corresponding manner as is per se known.

In a similar manner, a second braking conduit 18 communicates with the other output of the tandem master cylinder 2 at its upstream end and with wheel brake actuating cylinders 13 and 14 associated with the rear axle at its downwstream end. Corresponding two-port two-position valves 15 and 16 are again interposed in the braking conduit 8 and in the return conduit 20, respectively.

The hydraulic braking system which is equipped with the control arrangement 1 of the present invention further includes an auxiliary energy source which includes a hydraulic pump 5 that is driven by an electric motor, a pressure accumulator 8, a filtering unit 6 interposed between the supply reservoir 4 and the hydraulic pump 5, and a one-way or check valve 7 interposed between the hydraulic pump 5 and the pressure accumulator 8 and opening in direction toward the pressure accumulator 8. The pressure accumulator 8 has an output which is connected with an input of the brake force booster 3 by another hydraulic conduit. The input of the brake force booster 3 can be connected in a manner which conventional, with the output of the brake force booster 3 which communicates with the hydraulic conduit 10 in response to the actuation of the brake pedal 9.

A first one of the master pistons 34 which is closer to the brake pedal 9 is further provided at its secondary side with a positioning piston 7 which coaxially surrounds a piston rod or extension 70 associated with the first master piston 34 in a sealed manner. The positioning piston 67 has an outer diameter exceeding that of the first master piston 34 and is accommodated in an enlarged bore section of a master cylinder housings 73, in a sealed manner, for axial movement therein. An outer compression spring 68 which coaxially surrounds the positioning piston 67 urges the positioning piston 67 toward engagement with an axial abutment 69 of the master cylinder housing 73 in direction of a force F of the brake pedal 9. The axial abutment 69 extends in the circumferential direction of the bore. The pre-tension of the compression spring 68 is so selected that the positioning piston 67 is urged toward its defined rest position with a force which is just sufficient to overcome the friction forces caused by the material of the seals. The first master cylinder piston 34, the associated piston rod or extension 70, and the positioning piston 67 delimit at the secondary side of the first master piston 34 a sealed compartment which is in communication with the associated replenishment chamber 22. The rigid axial abutment 69 is provided, at the region of its inner circumference, with a slanted surface so that, when the positioning piston 67 engages in the same, an inner associated circumferential edge portion 75 of the positioning piston 67 is free and, consequently, the corresponding end face of the positioning piston 67 can be subjected to the pressure of the hydraulic fluid from the auxiliary energy source during the yet to be described antiskid control operation.

The end portion of the positioning piston 67 which faces away from the rigid axial abutment 69 has a circumferential edge portion 72 which, during operation, can be brought into engagement with an enlarged circumferential end portion 71 of the master cylinder extension 70 in an intermediate position of the master piston 34, if necessary. The master cylinder housing 74 is provided in a manner similar to that in which the axial abutment 69 is provided, with a further circumferential edge portion 76 which is closer to the brake pedal 9 and which serves as an axial end abutment for the positioning piston 67 when the pressure of the auxiliary energy source hydraulic fluid acts on the positioning piston 67 and when the first master piston 34 assumes the corresponding position, as will also be discussed in detail later on.

The hydraulic conduit 10 which extends between the output of the brake force booster 3 and the two replenishment chambers 22 of the master cylinder device 2 incorporates a normally closed electromagnetically actuatable two-port two-position valve 23, and a valve unit 30 which is arranged downstream thereof and which performs a further valve function for the return conduit 20 leading to the low-pressure supply reservoir. In the interior of the valve unit 30, there is provided a sliding piston 31 which is spring-loaded at one of its end faces, while another end face 32 thereof is acted upon by the pressure of hydraulic fluid supplied thereto from the pressure accumulator 8 through a hydraulic auxiliary energy supply conduit.

The replenishment chambers 22 which are associated with the two master cylinder pistons 34 accommodate spring-loaded tilting valves 29 which, when the brake pedal 9 is not depressed are mechanically actuated by the respective master piston 34 and, under these circumstances, establish communication with a hydraulic conduit 38 which leads from the replenishment chambers 22 to the low-pressure supply reservoir 4. A compensating conduit 37 which leads to the space of the valve unit 30 that accommodates the respective spring is joined with the hydraulic conduit 38.

During the operation of the control arrangement 1 of FIG. 1, the operation of the wheel brake actuating cylinders 11, 12, 13 and 14 is statically controlled in the conventional manner in two brake circuits in response to the depression of the brake pedal 9 in the direction of the braking force F. During this static control operation, the two-port two-position valve 23 interposed in the hydraulic conduit 10 is closed and, therefore, the brake valve device 3 acts as a brake power booster. The valve unit 30 establishes communication through the conduits 10 and 20 in normal situation and when auxiliary energy is available. In control operation, that is, during the antiskid control action, the two-port two-position valve 23 is switched into its open position, as a result of which the positioning piston 67 is axially moved to the right as considered in FIG. 1 until it reaches the circumferential edge portion 76 of the master cylinder housing 73 or the enlarged end portion 71 of the associated first master piston 34, provided that the latter lies closer than the circumferential edge portion 76. In this manner, a reserve volume of hydraulic fluid is preserved in the master cylinder device 2. In the second case, that is, when the circumferential edge portion 72 of the positioning piston 67 engages the enlarged end portion 71 of the first master piston 34 the positioning piston 67 can move further in the rearward direction until the circumferential edge portion 72 of the positioning piston 67 abuts the circumferential edge portion 76 of the master cylinder housing 73.

The controlled pressurized hydraulic fluid from the auxiliary energy source flows from the secondary side of the master piston 34 through the respective axial feeding bore 61 to the working side of the master piston 34, that is, into the working compartment and from there to the individual wheel brake actuating cylinders 11, 12, 13 and 14 so that the latter are controlled in a dynamic manner during the antiskid control operation.

When a reduction of a certain magnitude occurs in the pressure of the hydraulic fluid supplied from the auxiliary energy source, the pre-tensioning force of the spring of the valve unit 30 causes the sliding piston 31 to move in the rightward direction as considered in FIG. 1, so that communication through the hydraulic conduit 10 as well as through the return conduit 20 is interrupted. While it is true that, under these circumstances, no antiskid control action is possible anymore, it is assured in this manner that, in the case of emergency, the hydraulic fluid is preserved in the master cylinder device 2 and in the associated braking circuit and cannot flow toward and into the low-pressure hydraulic supply reservoir 4. Because of the drop in the pressure of the hydraulic fluid, the force of the compression spring 68 displaces the positioning piston 67 into its leftward initial position, so that the positioning piston 67 does not interfere with the movement of the first master piston 34 and the latter can be displaced leftwardly without any opposition from the positioning piston 67 beyond the position assumed when the auxiliary energy source is fully operational and the positioning piston 67 is urged in the rightward direction. In this manner, there is provided the possibility of emergency braking without braking force boosting with static control of the pressure supplied to the wheel brake actuating cylinders 11 to 14.

Figure 2:
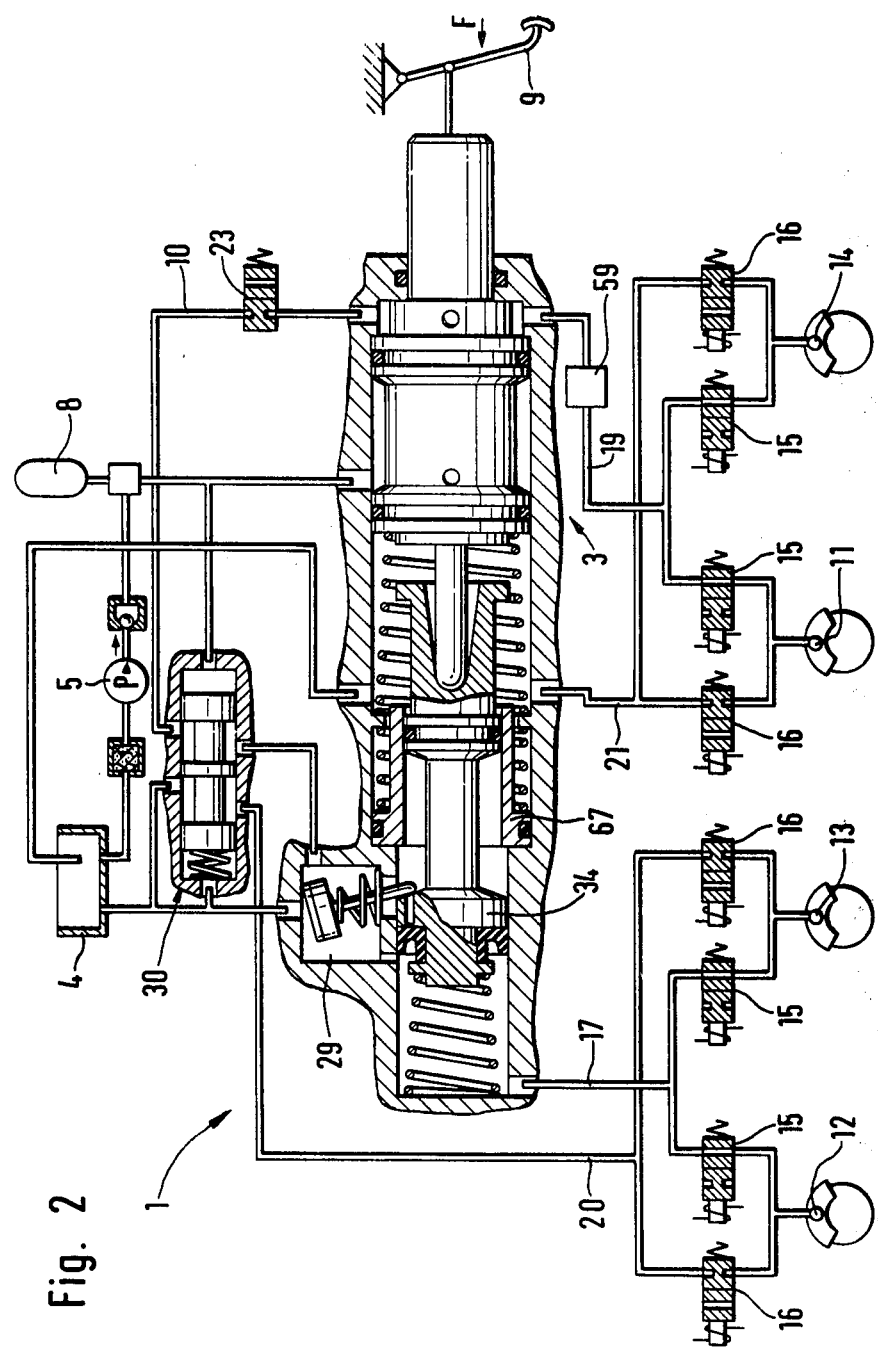
FIG. 2 is a view similar to FIG. 1 but of modified controlling arrangement interposed in a braking system of a different configuration.

The modified construction illustrated in FIG. 2 corresponds to that of FIG. 1 in so many respects that the same reference numerals have been used to indicate corresponding components, and that only the differences between these two constructions will be addressed here in some detail. In FIG. 2, the master cylinder device 2 is constructed as a single-piston master cylinder having one replenishing chamber 22 and one tilting valve 29 associated therewith. Hence, the single-piston master cylinder has only one working chamber and hence only one outlet which communicates with the braking conduit 17 which leads to wheel brake actuating cylinders 12 and 13 which are associated with a first pair of diagonally disposed vehicle wheels.

The wheel brake actuating cylinders 11 and 14 which are assigned to the other pair of diagonally disposed vehicle wheels are controlled as to their operation by pressurized hydraulic fluid supplied by the auxiliary energy source. To achieve this operation control, there is provided a dynamic braking conduit 19 which incorporates a simulating valve 59 and which leads from the output of the braking force booster 3 to the wheel brake actuating cylinders 11 and 14. A further return conduit 21 of the dynamic braking circuit leads from the wheel brake actuating cylinders 11 and 14 to the low-pressure supply reservoir 4 separately from the return conduit 20 of the static braking circuit, so that only the return conduit 20 of the static braking circuit passes through the valve unit 30 on its way to the supply reservoir 4.

In the construction depicted in FIG. 2, there is provided a positioning piston 67 which corresponds to that discussed above as to its general features. However, in contradistinction to the previously discussed construction, there is not provided any circumferential edge portion 76 on the housing 73 which would serve as a terminal abutment for the positioning piston 67.

Figure 3:
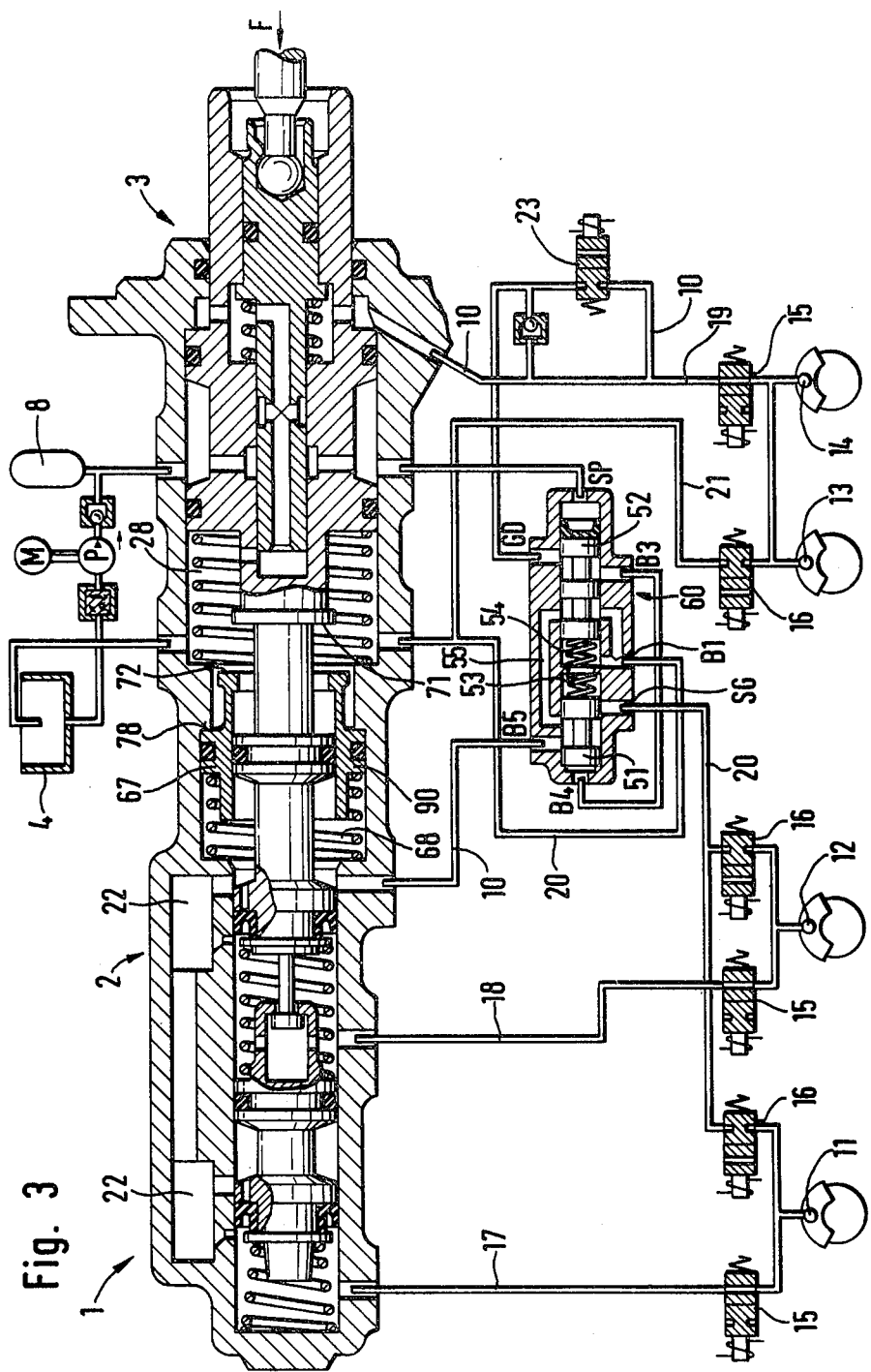
FIG. 3 is a view similar to that of FIG. 1 but with a positioning piston which is spring-biased in the direction opposite to that of application of the brake pedal force.

The modified construction of a control arrangement 1 according to the present invention as revealed in FIG. 3 corresponds as to the valves employed therein and the function thereof, to the constructions which have been discussed above so that once more the same reference numerals are being used to indicate cooresponding components and only those features which differ from those discussed above will be addressed here in some detail. The master cylinder device 2 of this construction is again constituted by a tandem master cylinder, and the control arrangement is so constructed as to be able to control two static and one dynamic braking circuit. Wheel brake actuating cylinders 13 and 14 associated with the rear axle of the vehicle are commonly included in the dynamic braking circuit and are controlled in common by control valves 15 and 16. The dynamic circuit has a separate return conduit 21 which passes through a compensation compartment 28 of the master cylinder device 2 on its way to the hydraulic supply reservoir 4. The wheel brake actuating cylinders 11 and 12 associated with the front wheels of the vehicle are supplied with the pressurized hydraulic braking fluid in separate brake conduits 17 and 18, the pressure of this hydraulic braking fluid being controlled in a static manner, and the operation of the wheel brake actuating cylinders 11 and 12 under imminent or actual skid conditions is individually controlled by corresponding control valves 15 and 16. In contradistinction to the above-discussed construction, the positioning piston 67 is acted upon by a compression spring 68 which is substantially situated at the side of the positioning piston 67 that is remote from the brake pedal 9. The compression spring 68 engages a corresponding edge portion of the housing. During operation in the antiskid control mode, the enlarged end portion 71 of the first master piston 34 which is closer to the brake pedal 9 engages the associated circumferential edge portion 72 of the positioning piston 67, so that the first master piston 34 and, consequently, also the brake pedal 9, is being held in its engaging position and cannot be displaced any further in the direction of application of the brake force F so long as the auxiliary energy source is fully operational.

The control arrangement 1 of FIG. 3 further includes valve means which corresponds as to its function to the tilting valves 29 described above in conjunction with FIGS. 1 and 2, such valve means being integrated in a valve unit 60 which also includes the valve means of the first valve unit 30. The valve unit 50 includes a valve housing having an internal bore which is subdivided into two chambers. Each of these chambers accommodates one of the two sliding pistons 51 and 52. Compression springs 53 and 54 urge the sliding pistons 51 and 52 away from one another. This results in a situation where the leftward sliding piston 61 as considered in FIG. 3 rests against an abutment which is rigid with the housing and the other sliding piston 52 is being held, during the operation, in a floating axial position similar to that encountered in the previously discussed valve unit 30, when pressure of the hydraulic fluid from the auxiliary energy source acts on the rightward end face of the sliding piston 52 as considered in FIG. 3. The auxiliary energy pressure is supplied into the interior of the valve unit 60 through an inlet port Sp. The sliding pistons 51 and 52 which are arranged in axial alignment with one another cooperate with an inner connecting passage 55. The housing of the valve unit 60 includes various ports Sp, GD, B3 SG and B1 which correspond to the ports of the valve unit 30 for the conduits 10 and 20 as well as for the auxiliary energy conduit 33. In addition thereto, however, there are provided further connecting ports B4 as well as a further radial port B5 at the region of the first sliding piston 51, wherein the radial connecting port B5 is in communication with the replenishment chamber 22.

The operation of this particular construction is as follows: when the brake pedal 9 is in its rest position, that is, when the brakes are not to be applied, the positioning piston 67 assumes its position as illustrated in the drawing, to which it is urged by the compression spring 69, and the compensating conduit of the master cylinder device 2 is connected with the low-pressure hydraulic supply reservoir 4 via the connecting port B5, the inner connecting duct 55, and the outlet port B1, while the fluid in the return conduit 20 or 21 passes through the compensating space 28 which is delimited at its axial ends by the positioning piston 67 and the brake valve device 3, and peripherally by the housing of the master cylinder device 2. Furthermore, in the absence of actuation of the brake pedal 9, the second sliding piston 52 of the valve unit 60 is being held, due to the action of the auxiliary energy hydraulic fluid in the illustrated floating position, while the first sliding piston 51 is displaced by the action of the compression spring 53 thereon in the leftward direction as considered in FIG. 3 and, consequently, the connecting port B4 is closed.

When a condition is encountered which calls for antiskid control action, the electromagnetically operated valve 23 is switched into its open position so that, because of the assumption of the open position by the sliding piston 52 in which communication is established between the ports GD and B3, elevated pressure is supplied to the port B4 and thus to the corresponding end face of the first sliding piston 51. As a result of this, the first sliding piston 51 is displaced against the force of the compression spring 53 in the rightward direction as seen in the drawing so that the port B5 is connected with the port B4 and separated from the passage 55. Simultaneously therewith, the port SG is connected with the port B1 through the inner connecting passage 55 and, consequently, communication is established through the return conduit 20 to the low-pressure hydraulic reservoir 4.

When the pressure of the auxiliary energy source below a predetermined threshold the force of the compression spring 54 moves the second sliding piston 52 in the rightward direction as considered in FIG. 3 so that the connection between the ports GD and B3, as well as between the ports SG and B1 is interrupted independently from the position assumed by the first sliding piston 51.

Hence, it is possible to displace the brake pedal 9 through its customary travel range during normal braking operation and while the wheel brake actuting cylinders are operated in a static and dynamic manner. On the other hand, when a braking condition occurs at one of the vehicle wheels which calls for antiskid control action the control valve 23 is switched into its open position, as a result of which not only the wheel brake actuating cylinders 13 and 14 associated with the rear axle, but also the wheel brake actating cylinders 11 and 12 associated with the front axle of the vehicle are controlled in a dynamic manner. As the antiskid control action is continued during the respective braking operation, the brake pedal 9 is depressed to such an extent that the parts 71 and 72 abut one another. Any further depression of the brake pedal 9 is now no longer possible, inasmuch as the positioning piston 67 which is acted upon by the hydraulic fluid from the auxiliary energy source acts as an axial arresting arrangement effective in the working direction of the master pistons of the master cylinder device 2. On the other hand, when the auxiliary energy fails, the brake pedal 9 can be further depressed while moving the positioning piston 67 in order to achieve emergency braking through static control of the operation of the wheel brakes.

Figure 4:
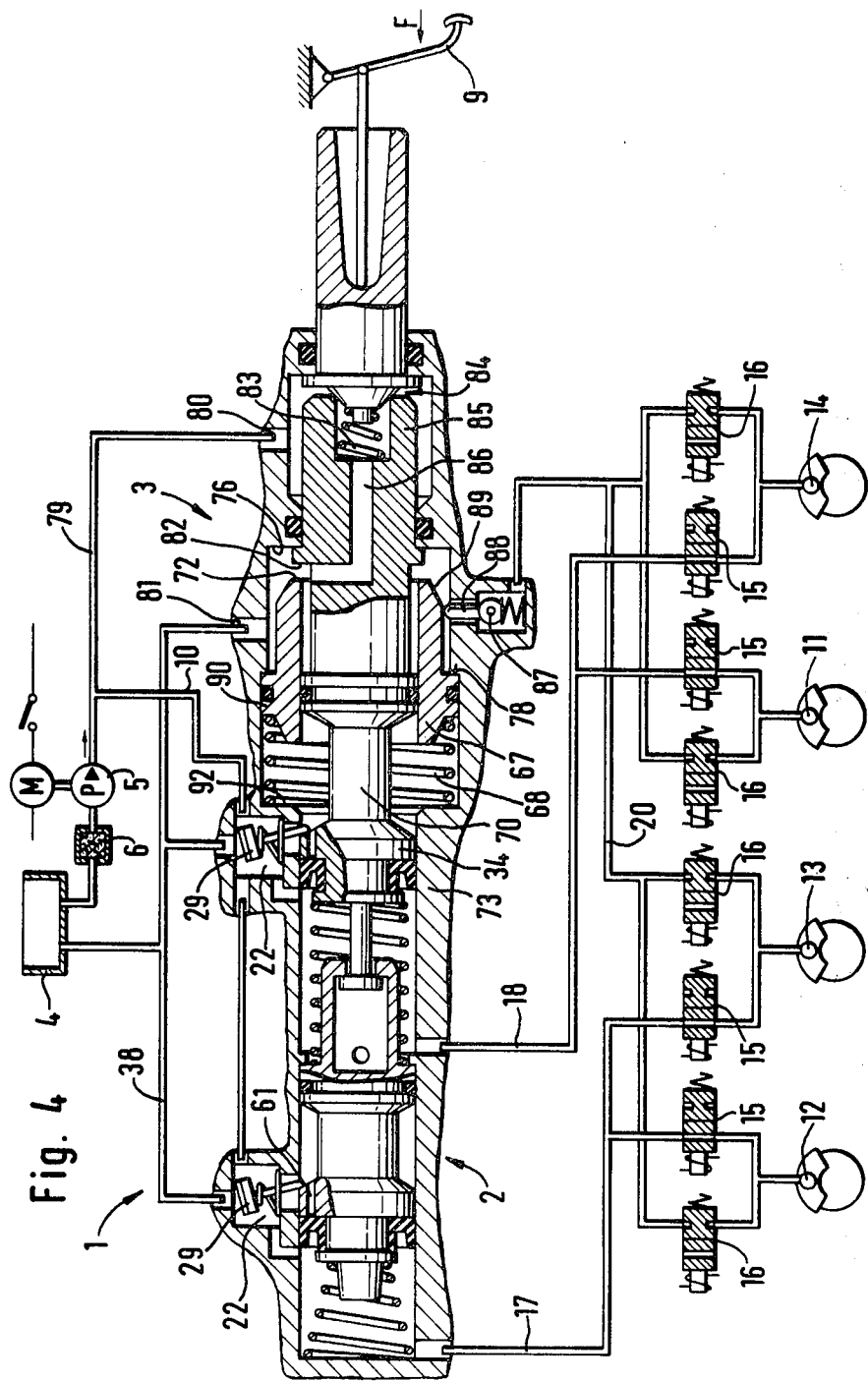
FIG. 4 is a view similar to FIG. 3 but including a return valve operated in dependence on the movement of the positioning piston.

FIG. 4 shows a further modified version of the control arrangement 1, wherein the same reference numerals as before are being used to identify the same or corresponding components. There is provided a master cylinder device 2 and a throttling valve arrangement 3 which is arranged in front of the master cylinder device and which can be operated in dependence on the braking force F of the brake pedal 9 by being displaced to a greater or lesser extent in the leftward direction as considered in the drawing.

In this modification, the master cylinder device 2 is constructed as a tandem master cylinder including two master cylinder pistons 34 with which there are associated respective replenishment chambers 22. Filling bores 61 are provided in the master piston 34 and provide a connection from the secondary side to the primary or working side of the master piston 34. Each master piston 34 carries an annular lip seal which acts as a one-way valve permitting flow of the hydraulic fluid through the filling bores 61 from the secondary to the primary side of the respective master pistons 34, but preventing escape of the hydraulic fluid from the primary side into the filling bores 61 and thus to the secondary side of the master piston 34, so long as the lip seal is intact.

Each working compartment of the tandem master cylinder 2 which is arranged at the primary side of the respective master piston 34 is in communication, through a brake conduit 17 and 18 with respective pairs of wheel brake actuating cylinders 12 and 13 or 11 and 14 which are associated with respective diagonally disposed wheels of the vehicle. Electromagnetically actuatable normally open two-port two-position valves 15 are interposed in the brake conduits 17 and 18, these valves 15 being operated by an antiskid control unit of a conventional construction which has again been omitted from the drawing, when the existance or imminence of impermissibly high slip values between the tires of the vehicle and the roadway is detected.

All of the wheel brake actuating cylinders 11 and 14 are connected through a return conduit 20 with the low-pressure supply reservoir 4, the return conduit 20 passing through the master cylinder-brake valve unit 2,3.

The return conduit 20 further includes electromagnetically actuatable, normally closed two-port two-position valves 16 which also are operated by the antiskid control unit during the application of an antiskid control action to at least one of the vehicle wheel brakes.

The throttling valve device 3 which is arranged in front of the tandem master cylinder 2 essentially consists of a valve member 85 which has a socket-shaped configuration and which is connected to the free end of an extension 70 of the master cylinder 34 of the master cylinder 34 which is closer to the brake pedal, as well as a throttling valve 84 which is mechanically connected to the brake pedal 9. The valve member 85 is provided with an inner duct 86 which, when the throttling valve member 84 is in its open position, connects the working side of the valve member 85 which is closer to the brake pedal 9 with the compensating side of the valve member 85 which is more remote from the brake pedal 9. The return conduit 20 which leads to the low-pressure hydraulic supply reservoir 4 communicates with the compensating side of the valve member 85.

The inner duct or passage 86 is enlarged at the region of the throttling valve member 84 and a compression spring 83 is received in the enlarged section of the passage 86. In the absence of actuation of the brake pedal 9, the compression spring 83 so acts on the throttling valve member 84 and on the valve member 85 as to urge the same apart and thus into their open position. In the open position of the throttling valve 84, 85 communication is established through a circulating conduit 79 which leads from the low-pressure hydraulic reservoir 4 to a throttling valve inlet port 80 and from the throttling valve outlet port 81 back to the low-pressure hydraulic supply reservoir 4. A filter unit 6 and a hydraulic pump 5 arranged downstream thereof are interposed in the circulating conduit 79 between the low-pressure hydraulic supply reservoir 4 and the throttling valve input port 80, the hydraulic pump 5 being operated only during the antiskid control action.

The circulating conduit 79 is provided, between the hydraulic pump 5 and the throttling valve inlet port 80 with a branch in the form of a hydraulic supply conduit 10 which leads to two replenishment chambers 22 associated with the master pistons 34.

The replenishment chambers 22 are further connected, through a compensating conduit 38, with the low-pressure hyraulic supply reservoir 4. A spring-loaded tilting valve 29 is provided in each of the replenishment chambers 22. The respective tilting valve 29 is so mechanically operatable by the associated master piston 34 that, is the absence of actuation of the brake pedal 9, the compenstating conduit 38 through the low-pressure hydraulic supply reservoir 4 is unobstructed, while the tilting valve 29 closes the compensating conduit 38 in each other position of the associated master piston 34.

A positioning piston 67 is arranged to the secondary side of that of the master pistons 34 which is closer to the brake pedal 9, such positioning 67 surrounding the enlarged end of the master piston rod 70 in a sealing and consentric manner, such that the piston rod 70 is axially movable relative to the positioning piston 67.

The positioning piston 67 is received for axial movement relative to the master cylinder housing 73 in an enlarged section of the internal bore of the master cylinder housing 73. An axial abutment 78 is provided which is rigid with the housing 73, and a compression spring 68 urges the positioning piston 67 toward engagement with the axial abutment 78. The compression spring 68 reacts at its other end, against a corresponding circumferential edge portion of the master cylinder housing 73. Hence the compression spring 68 exerts a pre-tensioning force on the positioning piston 67 which opposes the brake pedal force F and has such a magnitude as to just overcome the effect of the frictional forces encountered between the sealing material of the positioning piston 67 and the associated parts of the housing 73 and of the piston rod 70.

The valve member 85 is provided at the region of the compensating side of the master piston 34, with a circumferential projection 82 which, upon depression of the brake pedal 9, engages the circumferential edge portion 72 of the positioning piston 67 which is closer to the brake pedal 9. The function of the circumferential projection 82 in cooperation with the positioning piston 67 will still be described in the following part of the description.

Furthermore, the region of the positoning piston 67 which is provided with the circumferential edge portion 72 has a conical configuration converging toward the brake pedal 9 so as to form circumferential ramp or inclined surface 89. The inclined surface 89 cooperates with a tappet or valve stem 88 of a return valve 87 which is interposed in the return conduit 20. The valve stem 88 extends radially through the wall of the master cylinder housing 73 and is spring-biased in the radially inward direction. The return valve 87 is so arranged that the valve stem 88 engages the circumferential inclined surface 89 when the positioning piston 67 is in or close to contact with the stationary axial abutment 78 so that, in this engaging position, the return valve 87 is open and permits flow of the hydraulic fluid through the return conduit 20 to the low-pressure hydraulic supply reservoir 4.

On the other hand, when the positioning piston 67 assumes its leftward position as considered in the drawing, the circumferential inclined surface 89 and the valve stem 88 do not engage one another any longer, and thus the return valve 87 is closed.

The operation of the control arrangement 1 of FIG. 4 will now be explained. In the absence of depression of the brake pedal 9, the throttling valve 84, 85 is closed and the hydraulic pump 5 is not being operated. Once the brake pedal 9 is depressed to such an extent as to cause normal braking action without antiskid control, the throttling valve ports 84,85 of the throttling valve device 3 are jointly moved in the leftward direction as considered in FIG. 4 and, consequently, even the master cylinder device 2 is operated in the normal braking manner with static control of the operation of the wheel brake actuating cylinders 11 to 14. The two tilting valves 29 which are arranged in the tandem master cylinder 2 are permitted to move to their closed positions as the associated master pistons 34 move to the left as considered in FIG. 4, so that the communication of the replenishment chambers 22 with the conduit 38 leading to the low-pressure hydraulic supply reservoir 4 is interrupted.

When a condition calling for antiskid control action is encountered, the electric motor which drives the hydraulic pump 5 is energized, so that the hydraulic pump 5 supplies pressurized auxiliary hydraulic fluid which is conducted through the conduit 79 to the throttling valve device 3 as well as through the hydraulic conduit 10 to the replenishment chambers 22 and to the radial replenishment bores, so that this pressurized hydraulic fluid can flow from the secondary side to the working side of the respective master pistons 34. Thus, the operation of the wheel brake actuating cylinders 11 to 14 is controlled statically as well as dynamically during the antiskid control operation. Inasmuch as the auxiliary energy is supplied to the secondary side of that one of the master pistons 34 which is closer to the brake pedal 9 even the positioning piston 67 is acted upon by this pressurized auxiliary hydraulic fluid, and thus is displaced into and temporarily arrested in its illustrated rightward position. When this happens, the brake pedal 9 can be depressed only to such an extent that the circumferential projection 82 of the valve member 85 engages the associated circumferential edge portion of the positioning piston 67. Once this condition has been achieved, the control of the operation of the wheel brake actuating cylinders 11 to 14 occurs exclusively in a dynamic manner. The throttling valve device 3 is so constructed that the throttling valve 84, 85 is opened only when the effect of the dynamic pressure generated by the hydraulic pump 5 is greater than the brake pedal force F, or greater than the static pressure in the master cylinder device 2. Accordingly, once the dynamic pressure generated by the hydraulic pump 5 has reached the level of the static pressure after the initial running-in operation of the hydraulic pump 5, the excessive pump pressure is relieved through the then open throttling valve device 3. The brake pedal 9 can then be depressed further while the return conduit 20 is simultaneously closed and thus no additional volume of the hydraulic fluid can escape to the low-pressure hydraulic supply reservoir 4.

In this manner, there is provided an antiskid control arrangement of a hydraulic vehicle braking system in which a master cylinder device which is actuatable by a brake pedal is provided with at least one master piston cooperating with an associated replenishment chamber. The replenishment chamber is hydraulically connected through a substantially radial bore with the secondary side of the master piston. An axially displaceable circumferentially sealed positioning piston is provided at the secondary side of the master piston, and a piston rod of the master piston concentrically and sealingly passes through the positioning piston. The piston rod of the master piston is provided, at its free end which is closer to the brake pedal with an enlarged circumferential projection which can be so brought in engagement with an associated pedal-close circumferential edge of the positioning piston upon depression of the brake pedal and after admission of the pressurized hydraulic fluid from the auxiliary energy source to the secondary side of the master piston, that the master piston is moved into a defined position during antiskid control operation, so that the brake pedal cannot be floored during the antiskid control operation. In this manner, there is obtained a safe brake operation, especially in auxiliary energy saving braking systems. In an alternative, this engagement of the positioning piston can take place with a circumferential projection of a throttling valve of a possibly provided throttling valve device of the braking system.

While we have described above the principles of our invention in connection with specific apparatus, it is to be clearly understood that this description is made only by way of example and not as a limitation to the scope of our invention as set forth in the accompanying claims.

We claim:

1. An arrangement for controlling the effective pressure of a hydraulic braking fluid in a vehicle braking system provided with an auxiliary source of pressurized hydraulic fluid and antiskid control equipment, in dependence on the position of a brake pedal, comprising a master cylinder device including a housing defining a bore having a first section of a smaller diameter and an aligned adjacent second section of a larger diameter, and at least one master piston received in said first section of said bore for movement in opposite directions and operatively connected to the brake pedal for movement therewith at least in one of such directions, said master piston delimiting a working compartment in said first section of said bore frontwardly thereof as considered in the other direction and having an extension received with a spacing in said second section of said bore; at least one positioning piston surrounding said extension for sealed sliding relative thereto and to said housing in said second section of said bore; entraining means on said extension and on said positioning piston for engaging one another in an engaging position of said positioning piston relative to said extension; and means for admitting the pressurized fluid from the auxiliary source into said working compartment and into said second section of said bore frontwardly of said positioning piston during antiskid control action of the antiskid control equipment to replenish the supply of pressurized fluid in said working compartment and to urge said positioning piston into a predetermined position relative to said housing in which said entraining means is engaged and said master piston assumes a defined position within said bore.

2. The arrangement as defined in claim 1, wherein said entraining means includes an external annular projection at the free end portion of said extension and an annular contact zone on said positioning piston.

3. The arrangement as defined in claim 1, wherein said housing has an axial abutment for said positioning piston in said second section of said bore; and further comprising spring means for urging said positioning piston in the frontward direction toward engagement with said abutment.

4. The arrangement as defined in claim 3, wherein said positioning piston has an external annular flange and said housing has an annular zone situated rearwardly from said annular flange; and wherein said spring means includes a compression spring surrounding said positioning piston and acting on said annular flange and said annular zone.

5. The arrangement as defined in claim 1, further comprising stop menas on said housing extending into the path of movement of said entraining means of said positioning piston to be engaged by the latter in said predetermined position of said positioning piston and thus to define said defined position of said master piston.

6. The arrangement as defined in claim 1, wherein said master cylinder device further includes an additional master piston received in said first section of said bore in tandem with and frontwardly of said one master piston to delimit an additional working compartment frontwardly thereof, only said one master piston being equipped with said positioning piston.

7. The arrangement as defined in claim 1, wherein said housing has an axial abutment for said positioning piston in said second section of said bore; and further comprising spring means for urging said positioning piston in the rearward direction toward engagement with said abutment.

8. The arrangement as defined in claim 7, wherein said positioning piston has an external annular flange and said housing has an annular zone situated frontwardly from said annular flange; and wherein said spring means includes a compression spring surrounding said positioning piston and acting on said annular flange and said annular zone.

9. The arrangement as defined in claim 7 for use in a hydraulic braking system including at least one return conduit; further comprising a return valve interposed in the return conduit and mounted on said housing at said second section of said bore, said return valve having an actuating portion movable into and out of the path of movement of said positioning piston between its open and closed positions; and wherein said positioning piston has a frontwardly and outwardly inclined surface at its rearward end portion for engaging said actuating portion of said return valve and displacing the same toward said open position as said positioning piston approaches said predetermined position thereof.

10. The arrangement as defined in claim 1, and further comprising a throttling valve at least partially accommodated in said extension of said master piston.

* * * * *